(12) United States Patent
Su et al.

(10) Patent No.: US 11,182,452 B2
(45) Date of Patent: Nov. 23, 2021

(54) WEB ACCELERATION VIA LEARNING

(71) Applicant: Hughes Network Systems, LLC, Germantown, MD (US)

(72) Inventors: Chi-Jiun Su, Rockville, MD (US); Kaustubh Jain, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/569,050

(22) Filed: Sep. 12, 2019

(65) Prior Publication Data

US 2021/0081466 A1    Mar. 18, 2021

(51) Int. Cl.
*G06F 3/048* (2013.01)
*G06F 16/957* (2019.01)
*G06F 16/2455* (2019.01)

(52) U.S. Cl.
CPC ...... *G06F 16/957* (2019.01); *G06F 16/24552* (2019.01)

(58) Field of Classification Search
CPC .......................... G06F 16/957; G06F 16/24552
USPC ....................................................... 715/200
See application file for complete search history.

(56) References Cited

U.S. PATENT DOCUMENTS

| | | | |
|---|---|---|---|
| 9,037,638 B1 * | 5/2015 | Lepeska | H04L 67/2847 709/203 |
| 9,106,607 B1 * | 8/2015 | Lepeska | H04L 67/2842 |
| 9,456,050 B1 * | 9/2016 | Lepeska | H04L 67/02 |
| 9,582,600 B1 * | 2/2017 | Killian | G06F 40/154 |
| 9,723,053 B1 | 8/2017 | Pallemulle et al. | |
| 9,769,030 B1 * | 9/2017 | Ramalingam | H04L 41/22 |
| 9,912,718 B1 * | 3/2018 | Lepeska | H04L 67/42 |
| 10,462,036 B2 * | 10/2019 | Tran | H04L 43/0847 |
| 10,680,968 B2 * | 6/2020 | Hedbor | H04L 47/70 |
| 10,721,134 B2 * | 7/2020 | Papaloukopoulos | H04L 41/142 |
| 10,785,281 B1 * | 9/2020 | Cath | H04L 61/1511 |
| 10,855,797 B2 * | 12/2020 | Lepeska | G06F 16/957 |

(Continued)

OTHER PUBLICATIONS

Vaspol Ruamviboonsuk, Ravi Netravali, Muhammed Uluyol, Harsha V. Madhyastha. "Vroom: Accelerating the Mobile Web with Server-Aided Dependency Resolution," 2017. In Proceedings of the Conference of the ACM Special Interest Group on Data Communication (SIGCOMM '17). ACM, New York, NY, USA, 390-403.

(Continued)

*Primary Examiner* — David Phantana-angkool
(74) *Attorney, Agent, or Firm* — NovoTechIP International PLLC

(57) ABSTRACT

A method wherein resource data for a web resource is generated can include age, confidence level, cacheability level, cache expiration, and/or priority level. Resource readiness for the web page is prepared based on the resource data. This can include preconnecting to a domain having the web resource when the resource data indicates a first level of resource readiness; preloading the web resource from the domain when the browser is open when the resource data indicates a second level of resource readiness, where the second level of resource readiness is greater than the first level of resource readiness; or prefetching the web resource from the domain prior to opening of the browser when the resource data indicates a third level of resource readiness, where the third level of resource readiness is greater than the second level of resource readiness.

18 Claims, 16 Drawing Sheets

(56) References Cited

U.S. PATENT DOCUMENTS

| | | | |
|---|---|---|---|
| 10,860,715 B2* | 12/2020 | Shi | H04L 63/0245 |
| 2018/0131620 A1* | 5/2018 | Su | H04L 61/15 |
| 2019/0222667 A1 | 7/2019 | Jaiswal et al. | |
| 2020/0213211 A1* | 7/2020 | Jain | H04L 43/08 |
| 2020/0287956 A1* | 9/2020 | Cath | H04L 61/1511 |

OTHER PUBLICATIONS

Ravi Netravali, Ameesh Goyal, James Mickens, Hari Balakrishnan. "Polaris: faster page loads using fine-grained dependency tracking", 2016. In Proceedings of the 13th Usenix Conference on Networked Systems Design and Implementation (NSDI'16). USENIX Association, Berkeley, CA, USA, 123-136.

Xiao Sophia Wang, Arvind Krishnamurthy, David Wetherall. "Speeding up web page loads with Shandian", 2016. In Proceedings of the 13th Usenix Conference on Networked Systems Design and Implementation (NSDI'16). USENIX Association, Berkeley, CA, USA, 109-122.

Ashiwan Sivakumar, Shankaranarayanan Puzhavakath Narayanan, Vijay Gopalakrishnan, Seungjoon Lee, Sanjay Rao, Subhabrata Sen. "Parcel: Proxy Assisted BRowsing in Cellular networks for Energy and Latency reduction", 2014. In Proceedings of the 10th ACM International on Conference on emerging Networking Experiments and Technologies (CoNEXT '14). ACM, New York, NY, USA, 325-336.

Xiao Sophia Wang, Aruna Balasubramanian, Arvind Krishnamurthy, David Wetherall. "Demystifying page load performance with WProf", 2013. In Proceedings of the 10th USENIX conference on Networked Systems Design and Implementation (nsdi'13), Nick Feamster and Jeff Mogul (Eds.). USENIX Association, Berkeley, CA, USA, 473-486.

Ilya Grigorik. "Resource Hints", W3C Working Draft Jan. 15, 2018 [retrieved on Nov. 12, 2019]. Retrieved from the Internet <URL: https://www.w3.org/TR/2018/WD-resource-hints-20180115/>, pp. 1-12.

Jonathan Garbee. "Resource Timing", [retrieved on Nov. 12, 2019]. Retrieved from the Internet <URL: https://developers.google.com/web/tools/chrome-devtools/network-performance/understanding-resource-timing>, pp. 1-10.

Todd Reifsteck, Ilya Grigorik, Arvind Jain, Jatinder Mann, Zhiheng Wang, Anderson Quach. "Resource Timing Level 2", W3C Working Draft Nov. 5, 2018, [retrieved on Nov. 12, 2019]. Retrieved from the Internet <URL: https://www.w3.org/TR/2018/WD-resource-timing-2-20181105/>, pp. 1-12.

Ilya Grigorik, Tobin Titus, Jatinder Mann, Arvind Jain. "Navigation Timing Level 2", W3C Working Draft Nov. 5, 2018, [retrieved on Nov. 12, 2019]. Retrieved from the Internet <URL: https://www.w3.org/TR/2018/WD-navigation-timing-2-20181105/>, pp. 1-13.

Mike Belshe. "More Bandwidth Doesn't Matter (much)", Apr. 8, 2010, Retrieved from the Internet <URL: https://docs.google.com/a/chromium.org/viewer?a=v&pid=sites&srcid=Y2hyb21pdW0ub3JnfGRIdnxneDoxMzcyOWI1N2I4YzI3NzE2>, pp. 1-6.

Ilya Grigorik, Yoav Weiss. "Preload", W3C Editor's Draft Oct. 17, 2018, Retrieved from the Internet <URL: https://w3c.github.io/preload/>, pp. 1-12.

Grigorik, Ilya; "High Performance Networking in Google Chrome—igvita.com"; Jan. 31, 2013; pp. 1-23; retrieved from the Internet: URL: https://www.igvita.com/posa/high-performance-networking-in-google-chrome/.

International Search Report and Written Opinion dated Dec. 3, 2020 by the International Searching Authority (European Patent Office) in PCT Application PCT/US2020/050759.

* cited by examiner

WEB ACCELERATION VIA LEARNING

TECHNICAL FIELD

The present application is in the field of devices, methods, and computer program products for generating a synopsis of a meeting web acceleration via learning.

BACKGROUND

Web page load time (PLT) affects a user's experience and consequently the web content provider's revenue. PLT performance is especially degraded for networks with disadvantaged links such as mobile and satellite networks. Therefore, web acceleration techniques are usually deployed to accelerate the PLT of unencrypted web pages in mobile and satellite networks. However, the use of encrypted web pages is increasing, and it is becoming challenging to accelerate the PLT using existing techniques.

SUMMARY

In one general aspect, the systems and techniques disclosed herein provide a method of reducing load time of a web page in a browser where resource data for a web resource utilized to load the web page is generating via a resource data processor. The resource data can include the age of the web resource, the confidence level of the web resource indicating a probability that the web resource will be retrieved in a future visit by a user based on a history of retrievals of the web resource, the cacheability level of the web resource, the cache expiration of the web resource, and/or the priority level of the web resource. The level of resource readiness of the web resource can be determined via a resource readiness processor based on the resource data. Resource readiness for the web page can be prepared via a web acceleration processor based on the level of resource readiness of the web resource. The preparing resource readiness can include preconnecting to a domain having the web resource when a first level of resource readiness is determined, preloading the web resource from the domain when a second level of a resource readiness is determined, the second level of resource readiness being greater than the first level of resource readiness, wherein the preloading is performed when the browser is open, or prefetching the web resource from the domain when a third level of a resource readiness is determined, the third level of resource readiness being greater than the second level of resource readiness, wherein the prefetching is performed prior to opening of the browser.

A system of reducing load time of a web page in a browser, in accordance with a second aspect of this disclosure, can include a resource data processor that generates resource data for a web resource utilized to load the web page. The resource data can include at least two of the age of the web resource, the confidence level of the web resource indicating a probability that the web resource will be retrieved in a future visit by a user based on a history of retrievals of the web resource, the cacheability level of the web resource, the cache expiration of the web resource, and the priority level of the web resource. A resource readiness processor connected to the resource data processor can determine the level of resource readiness based on the resource data. A web acceleration processor connected to the resource readiness processor can prepare resource readiness for the web page based on the level of resource readiness. The preparing resource readiness can include preconnecting to a domain having the web resource when a first level of resource readiness is determined, preloading the web resource from the domain when a second level of resource readiness is determined, the second level of resource readiness being greater than the first level of resource readiness, wherein the preloading is performed when the browser is open, or prefetching the web resource from the domain when a third level of resource readiness is determined, the third level of resource readiness being greater than the second level of resource readiness, wherein the prefetching is performed prior to opening of the browser.

A computer program product for reducing load time of an encrypted web page in a browser, in accordance with a third aspect of this disclosure, can includes a computer readable storage medium having encoded thereon first program instructions executable by a processor to cause the processor to generate resource data for a web resource utilized to load the encrypted web page. The resource data can include the age of the web resource, the confidence level of the web resource indicating a probability that the web resource will be retrieved in a future visit by a user based on a history of retrievals of the web resource, the cacheability level of the web resource, the cache expiration of the web resource, and the priority level of the web resource. Second program instructions executable by the processor can cause the processor to determine a level of resource readiness based on the resource data. Third program instructions executable by the processor can cause the processor to prepare resource readiness for the web page based on the level of resource readiness. The preparing resource readiness can include preconnecting to a domain having the web resource when a first level of resource readiness is determined, preloading the web resource from the domain when a second level of resource readiness is determined, the second level of resource readiness being greater than the first level of resource readiness, wherein the preloading is performed when the browser is open, or prefetching the web resource from the domain when a third level of resource readiness is determined, the third level of resource readiness being greater than the second level of resource readiness, wherein the prefetching is performed prior to opening of the browser.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 5A-5C illustrate a "waterfall" diagram of loading a web page;

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following implementations introduce a method of reducing load time of a web page in a browser by preconnecting to a domain having a web resource used to load the web page, preloading the web resource from the domain, or prefetching the web resource from the domain. The determination of whether to preconnect, preload, or prefetch the web resource is based on resource data for the web resource. Resource data can include the age, confidence level, cacheability level, cache expiration, and/or priority level of the web resource.

Web browsing is one of the most prominent applications used by everyone every day. Web page load time (PLT) is a fundamental metric for web performance, which measures how fast a web page is loaded and is a critical Quality of Experience (QoE) metric of a user. The BBC found that they lost an additional 10% of users for every additional second that their site took to load. The study between time and a user's perception shows that there is likely a mental context switch after 1 second. All well-quoted studies from Google, Microsoft, and Amazon conclude that web performance translates directly to dollars and cents. Moreover, page load time is a fundamental performance metric for customer satisfaction and customer churns for an internet service provider.

Figure 1A:
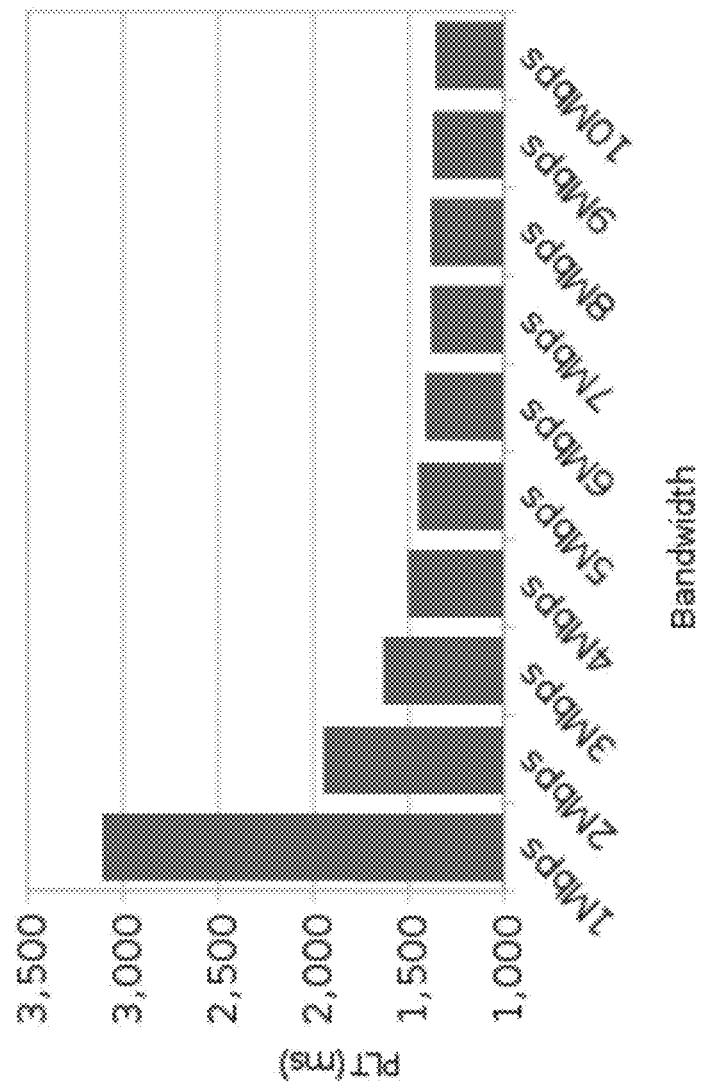
FIG. 1A is a bar graph illustrating web page load time in milliseconds versus bandwidth in megabytes per second.
Figure 1B:
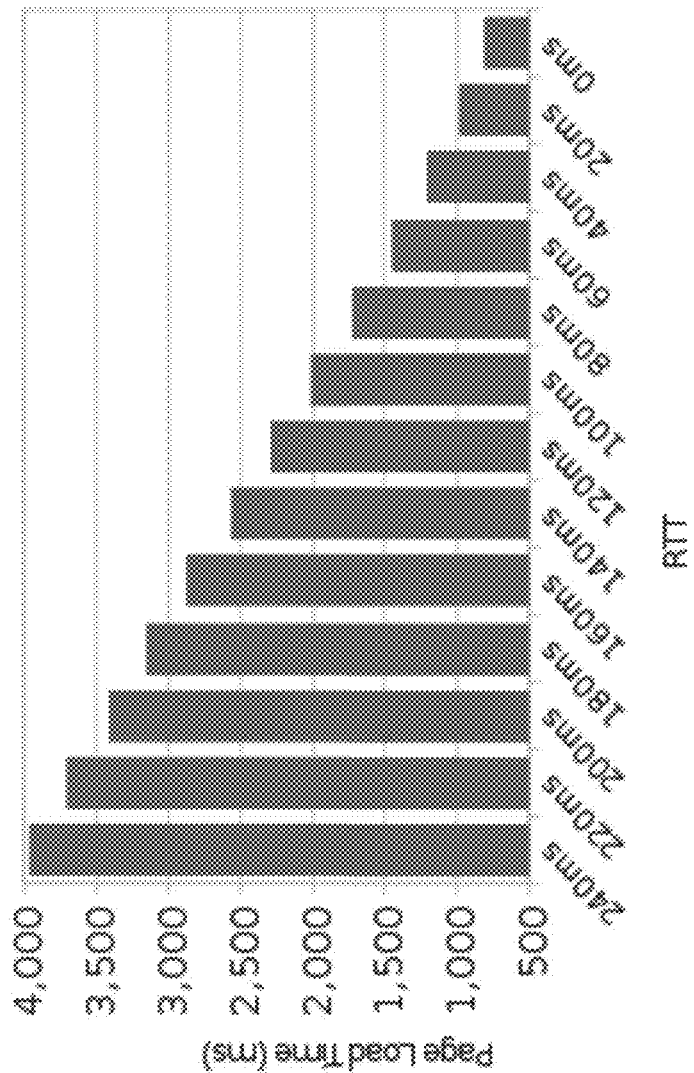
FIG. 1B is a bar graph illustrating web page load time in milliseconds versus Round Trip Time in milliseconds.

One study shows that Round Trip Time (RTT) between a web client and a web server matters much more than bandwidth for faster page load time. As shown in FIG. 1A, there are diminishing returns in page load time as the bandwidth gets higher beyond 5 Mbps. As shown in FIG. 1B, page load time continues to worsen as RTT increases and improves with the decreasing RTT. Therefore, page load time is longer in an internet service network with a long latency link, especially in a Geo Satellite broadband service system. Minimum RTT in a typically Geo satellite system is around 600 milliseconds due to the propagation delay alone. As a result, it is desired to employ web acceleration techniques to reduce page load time in a Geo Satellite system to make it comparable to a terrestrial broadband service system.

Unencrypted web pages are typically fetched by a web client from web servers using an HTTP application layer protocol over Transmission Control Protocol (TCP). For HTTP over TCP, TCP performance enhancing proxies (PEP) may be deployed to accelerate TCP protocol; and, prefetching and caching can be used to accelerate web pages over HTTP for a network with long RTT links.

Encrypted web pages can also be transferred from web servers to a web client using Hyper Text Transfer Protocol Secure (HTTPS) over TCP. HTTPS is an encrypted end-to-end communication channel for HTTP messages using Transport Layer Security (TLS). Previous approaches for prefetching and caching of web pages no longer works with HTTPS unless a Man-In-The-Middle (MITM) technique breaking the end-to-end secure tunnel is applied. TCP PEP can still be used for TCP acceleration. As a consequence, page load time with HTTPS is slower than that with HTTP over a long RTT link.

QUIC (Google Inc., Mountain View, Calif., U.S.), a newer transport protocol, is designed to reduce TCP connection and transport latency and improve TCP performance. In QUIC, in addition to transport layer payload, transport layer headers are also encrypted and authenticated. QUIC is being standardized at the Internet Engineering Task Force (IETF) standardization organization to become an internet standard protocol. QUIC is intended to replace TCP to carry HTTP for web pages. With HTTP over QUIC, it is not possible to accelerate HTTP by prefetching and caching, nor is it possible to accelerate TCP by TCP PEP. Unless QUIC is also optimized for networks with long RTT links, page load time over HTTP over QUIC will increase.

The web acceleration system described herein can maintain end-to-end encryption without a Man-In-The-Middle (MITM). In at least one implementation, the system does not use a split-browser approach where the cloud-based acceleration unit sees the user's unencrypted data. The split-browser approach is used in Opera Mini and Amazon Silk. All web contents and the user's data can remain inside the web client at all times. The system can learn from the history of metadata and performance data (not the content of the web resources) and the acceleration may improve as the data grows. The system can make efficient use of network resources and no change may be required for web servers and content providers.

The system can accelerate encrypted web pages over TCP and encrypted transport layer protocols, such as QUIC. While web page load time may only improve slightly when bandwidth is increased to above 5 Megabits per second (Mbps), web page load time may significantly and continuously degrade with increasing RTT. In a broadband internet service over Geo Satellite, RTT can be about 600 milliseconds (msec) due to propagation delay alone and it can be as high as 1 second in a congested system at busy hours.

The use of HTTPS is becoming widespread with the emergence of certificate authorities (CA), such as Let's Encrypt (San Francisco, Calif., U.S.), which offers free Secure Sockets Layer (SSL) certificates. The use of HTTPS can prevent web acceleration approaches such as prefetching and caching of web pages by the network elements. In at least one implementation, HTTPS protocol runs over TCP, which is accelerated for the network with disadvantaged links because TCP protocol does not encrypt its header or authenticate its payload. With HTTPS over QUIC, web pages may not be accelerated at the HTTP layer; and, TCP may not be accelerated at the transport layer. Consequently, HTTPS over QUIC may perform worse than HTTP over TCP and may perform worse than HTTPS over TCP. The system can provide valuable web acceleration for HTTPS over QUIC especially for broadband satellite service with Geo Satellites. Both Geo/Leo satellite systems and terrestrial broadband systems with disadvantage links, such as mobile cellular links, may employ the systems and methods described herein.

In at least one implementation, web acceleration is performed inside a web client, where the web client also collects history of metadata and performance data, which is processed offline. Offline processing can be performed inside the web client and/or at a server in the cloud. The offline processing can generate resource data that is used by the web client to prefetch, preload, and/or preconnect to a domain according to the characteristics of the web resources in the history. The acceleration system can work in a standalone web client or in a web client connected to a cloud server.

A web page can consist of several web resources (also known as Web objects) that can include HTML, JavaScript, Cascading Style Sheets (CSS), images, videos, and other media. A web page load can start with a user-initiated request by typing a web address, also known as a Universal Resource Locator (URL). The main HTML addressed by the URL can be fetched by the network stack of the web client. The HTML Parser of the web client can start to parse the HTML of the web page and request embedded resources via the network stack until the web page is fully parsed. The result of the parsing process can be a document object model (DOM) tree, which is an in-memory representation of the web page. The DOM tree can provide a common interface for JavaScript to manipulate the web page. The browser can progressively render the web page during the load process, convert the DOM tree to a layout tree, and further to pixels on the screen. The browser can fire a load event when it finishes loading the DOM tree. There may be three main tasks involved in loading a web page: network stack fetching resources, JavaScript execution, and page layout and rendering.

Figure 2:
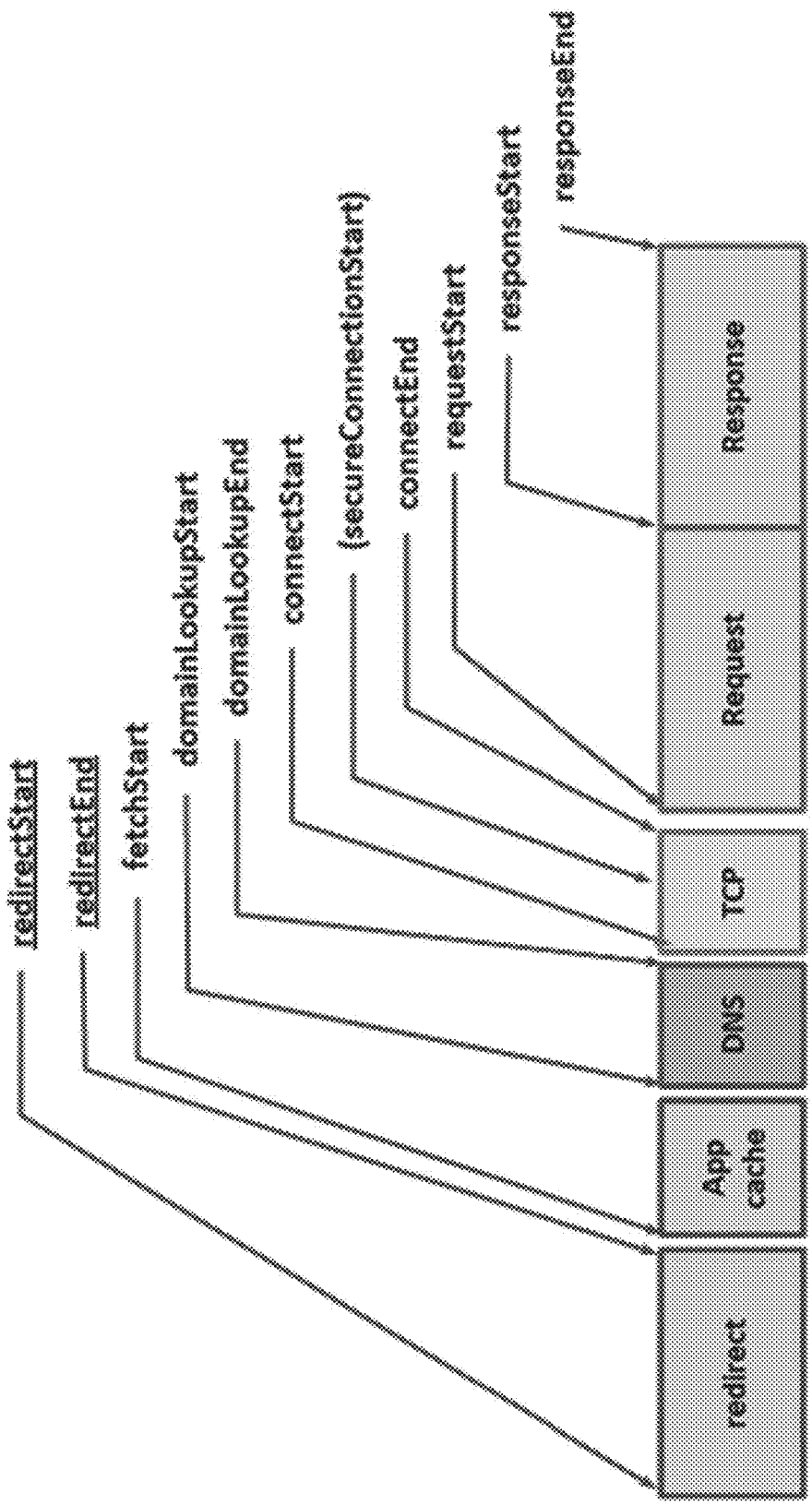
FIG. 2 is a diagram illustrating steps and timing of fetching a resource.
Figure 3:
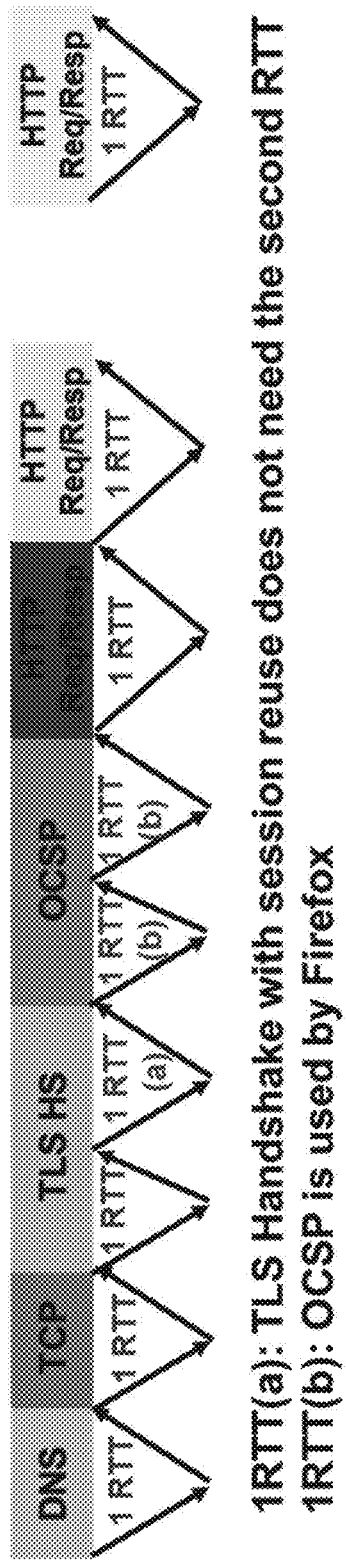
FIG. 3 is a diagram illustrating an example of number of RTTs required to fetch a web resource.

FIG. 2 is a diagram illustrating steps and timing of fetching a web resource. Given a URL of a web resource, the local application cache may be checked first. The previously fetched web resource in the cache can fulfill the request instantly without sending out the request to the server if there is a match. Otherwise, if there is no existing connection to reuse to the same web server, a Domain Name System (DNS) lookup can be performed to resolve the hostname to its IP address. A DNS lookup may be served immediately by the browser or operating system if the DNS response is already in the cache. "TCP" in FIG. 2 can include a connection setup for both TCP and TLS protocol. After a secure connection has been setup, the HTTP request can be sent to the web server which, after processing the request, can respond with a HTTP response to the web client. FIG. 3 is a diagram illustrating an example of the number of RTTs required to fetch a web resource. Connection setup alone may take 3 to 6 RTTs. It can take an additional RTT for an HTTP request and response.

Figure 4:
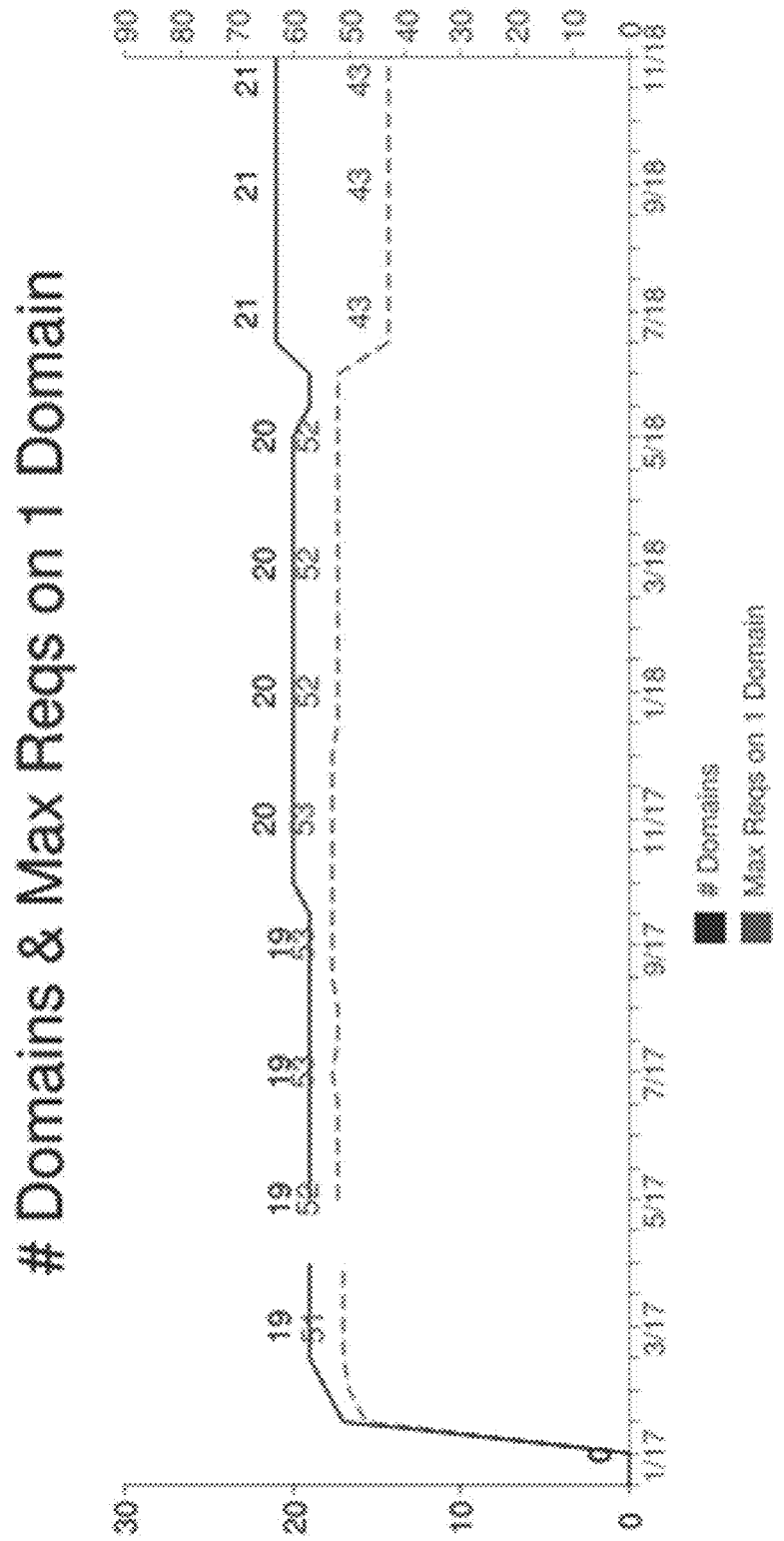
FIG. 4 is a graph illustrating the average number of domains per web page and the maximum number of requests per domain.

According to HTTP Archive (httparchive.org), which periodically crawls the Alexa Top 1 Million URLs and measures statistics, the median total page size of a web page is about 1.5 MBs for a desktop. On average, the majority of bytes on a web page are from images. The average web page has a total of 3135 kB, where 1711 kB are from images, 48 kB are from HTML, 95 kB are from stylesheets, 660 kB are from scripts, 115 kB are from fonts, 471 kB are from video, and 13 kB are from other (from httparchive.org on Nov. 28, 2018). For a 5 Mbps bandwidth link, the web page load time for the median size page is NOT 1.5*8/5=300 msec. The median total number of requests to load a web page is 75 (httparchive.org, Nov. 28, 2018). The average number of domains per web page is approximately 21 and the maximum number of requests per domain is approximately 43 as shown in FIG. 4. FIG. 4 is a graph illustrating the average number of domains per web page and the maximum number of requests per domain from httparchive.org accessed on Nov. 18, 2018. There may be at least one TCP/TLS connection required to send a request to a domain. The median total number of TCP connection per page is approximately 10 (httparchive.org, Nov. 28, 2018). It may require several RTTs to set up a TCP/TLS connection.

Figure 5A:
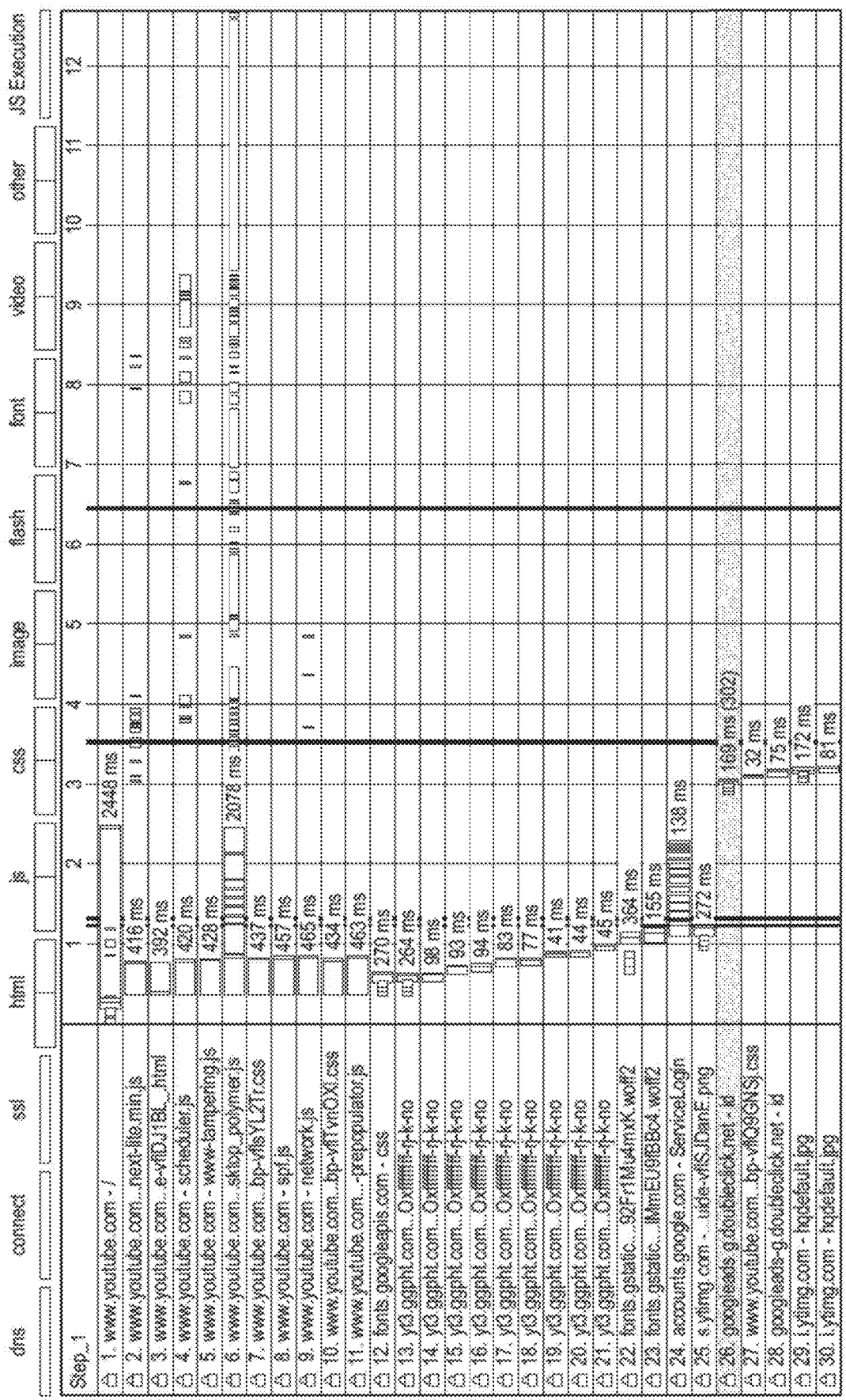
Figure 5B:
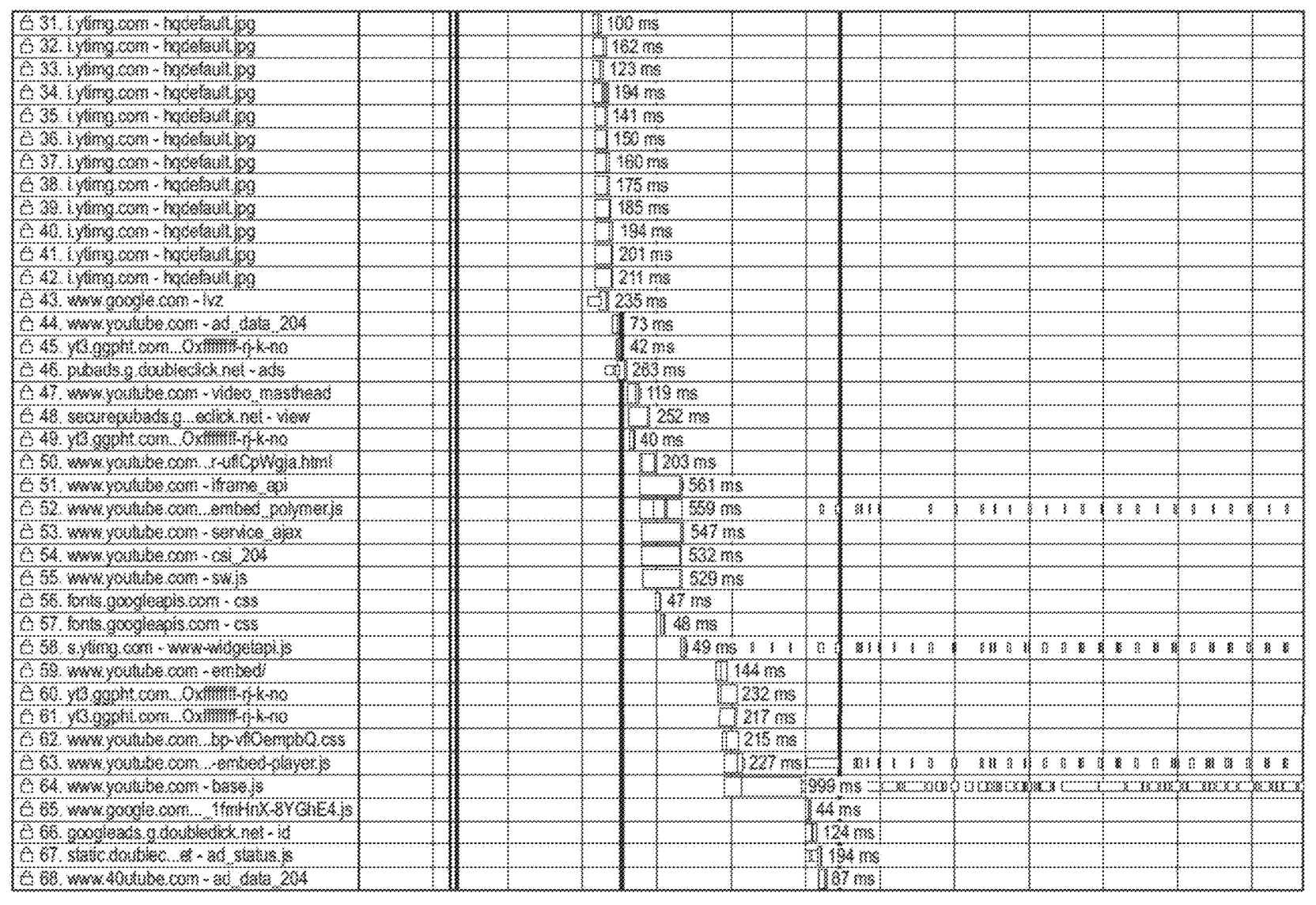
Figure 5C:
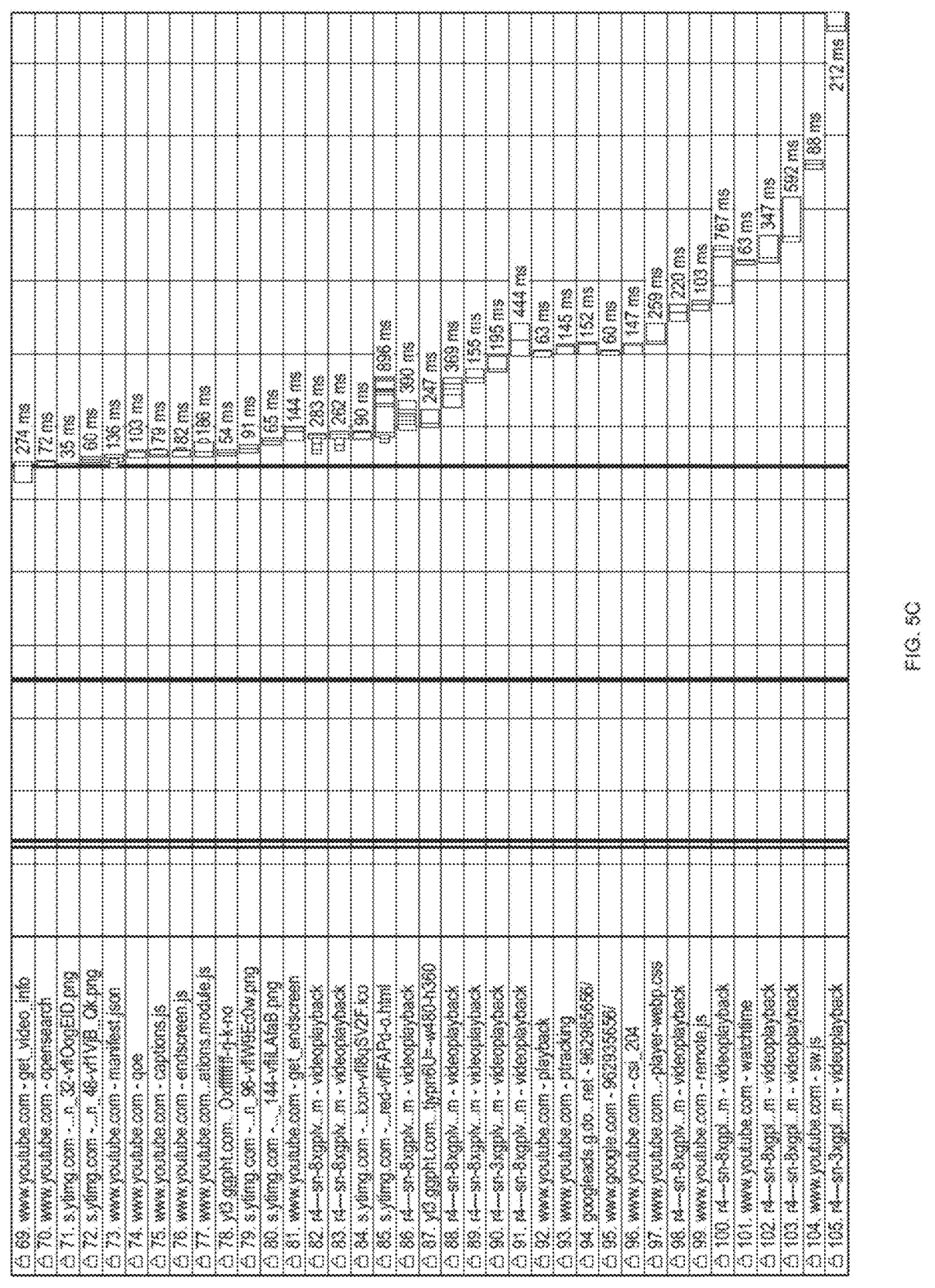

FIGS. 5A-5C illustrate a "waterfall" diagram of loading the web page "www.youtube.com" recorded at "web pagetest.org" on Nov. 28, 2018. A waterfall diagram can provide a graphical view depicting all of the web resources loaded by a web client showing both the order in which those web resources were loaded and how long it took to load each web resource. First, the main HTML can be fetched. HTML parsing can be performed incrementally to discover the required web resources and to dispatch the necessary requests in parallel if possible. The scheduling of when a web resource is fetched can in large part be determined by the structure of the markup of the HTML as well as by prioritization of the web client. There may be dependencies of some web resources on other web resources that need to be fetched first, and not all of the web resources can be fetched in parallel. In the example illustrated in FIGS. 5A-5C, there are 13 domains and 15 TCP/TLS connections to be set up.

All web resources in a web page cannot be fetched in parallel simultaneously because some resources are not known and are only discovered as a result of execution of a JavaScript. In some instances, an HTML <script> tag must be parsed, the file must be downloaded, and the JavaScript code in the file must be executed before going to the next web resource. Some of the dependencies may be due to the choice of implementation of a web client.

Figure 6:
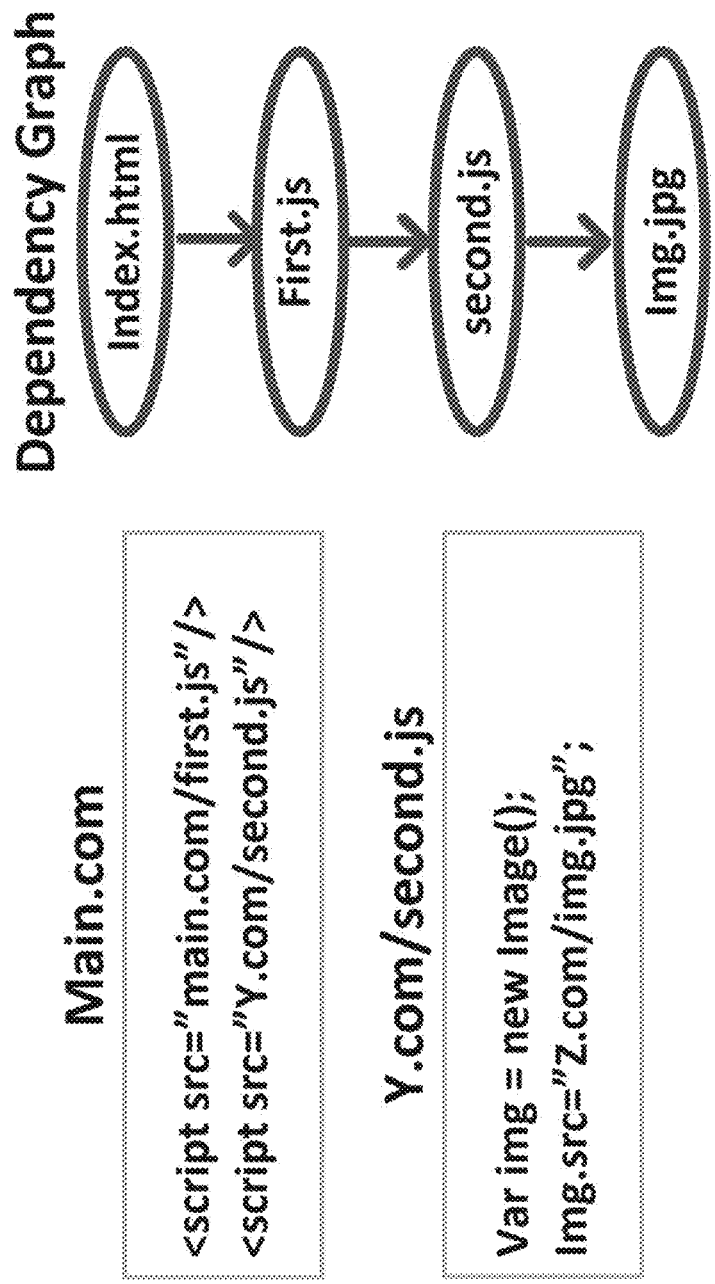
FIG. 6 is a diagram illustrating dependencies among web resources for an example web page.

FIG. 6 is a diagram illustrating dependencies among web resources for an example web page. JavaScripts, without async or defer, may block HTML parsing and they may need to be executed first. One study states that a majority of JavaScripts are synchronous scripts. Thus, in the example illustrated in FIG. 6, "first.js" must be fetched and executed before "Y.com/second.js" even though "first.js" does not have any impact on "second.js". Then, in the same example, "second.js" must be fetched and executed to discover a new resource, i.e., "Z.com/img.jpg".

As shown above, web pages can be complex and contain approximately 100 resources and approximately 20 domains. As also discussed above, there can be complicated inter-dependencies among web resources that result in the inefficient utilization of network and computer resources.

The total number of web resources and total number of domains may be limiting factors in loading a web page. In at least one implementation, the median total number of resources is approximately 75 and average number of domains is approximately 21. For example, the web page "youtube.com" can have 105 resources and 13 domains. JavaScripts are another factor that can determine how long a web page takes to load. As described above, the web page load process may stall until a JavaScript is fetched and executed. HTTParchive data shows that the median number of requests for JavaScript is approximately 20. CSS can block rendering, layout and painting of a web page, and best practices may encourage developers to place CSS tags at the top of web pages. In at least one implementation, a script tag (e.g., JavaScript) reads CSS style properties from the DOM tree and therefore CSS evaluation must block JavaScript execution. Another limiting factor in loading a web page may include a coarse-grained dependency graph that is usually used by a web client together with the inter-dependency among web resources. This can prevent the efficient use of network resources for fetching web resources and computer resources for parsing/executing HTML/JavaScript/CSS.

The system can accelerate web page load time to provide critical blocking resources, such as HTML, JavaScripts and CSS, to a web client as soon as possible. The system can optimally put web resources in a cache ahead of the time without being requested by the web client. In addition, web resources can be prioritized while fetching and the web client can be notified about dependencies among the web resources.

The following discussion provides an example where a user has frequently visited the web page "main.com," which usually has two other associated domains, "Y.com" and "Z.com". The following are web resources that are usually required for the web page "main.com": "first.js" in "main.com," "second.js" in "Y.com," and "img.jpg" in "Z.com." In the domain "Y.com," "second.js" has no dependencies on execution of JavaScript, "first.js" in "main.com." Based on this history, the web resources "main.com/First.js," "Y.com/Second.js," and "Z.com/img.jpg" can be prefetched and stored in the cache of the web client ahead of the time, e.g., during idle time. If the system is not highly sure about the exact web resources that are needed from "Y.com" and "Z.com," but the system is sure that some web resources from "Y.com" and "Z.com" are needed for the "main.com" web page, connections can be set up to "Y.com" and "Z.com" ahead of the time. This preconnection can include DNS lookup, TCP handshakes and TLS handshakes. "Y.com/Second.js" can be fetched and executed without waiting for the execution of "main.com/First.js" to be completed.

Figure 7:
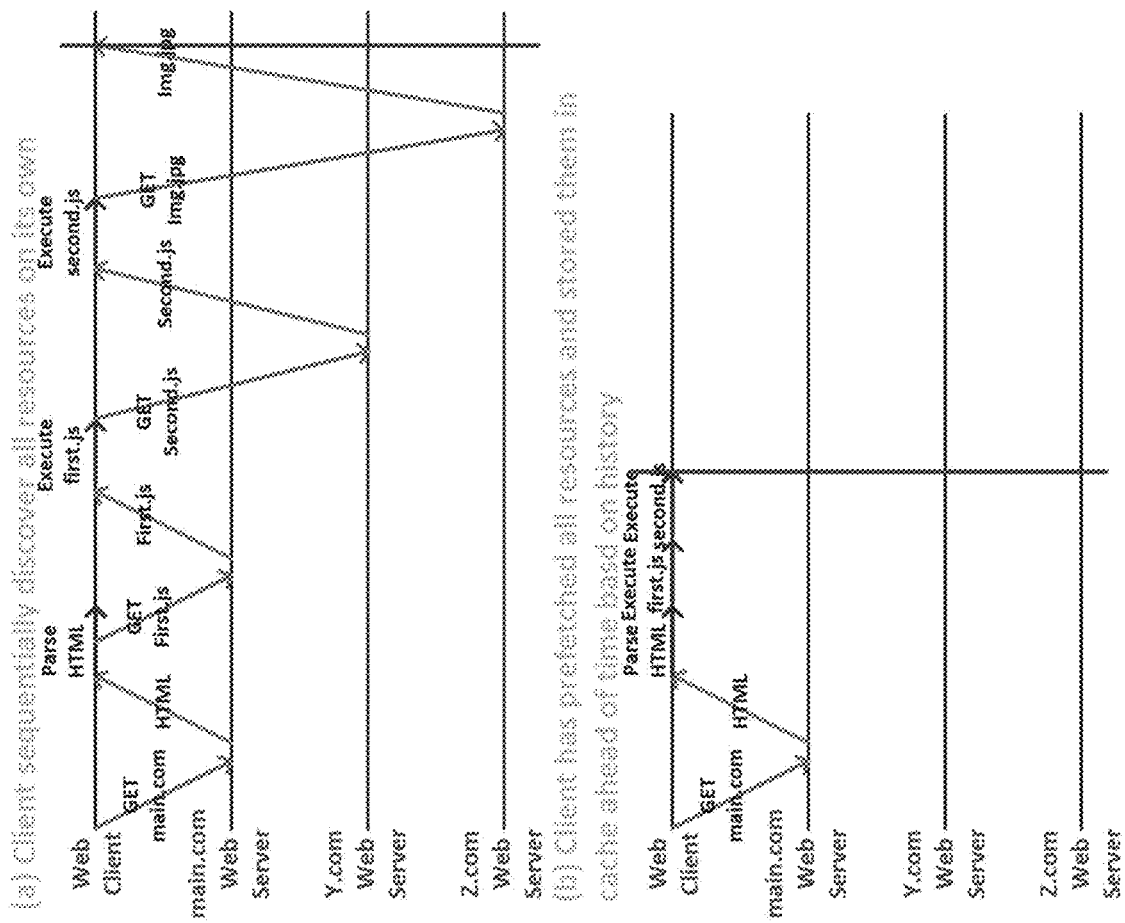
FIG. 7 is a diagram illustrating a shorter web page load time due to web acceleration using prefetching based on history.

FIG. 7 illustrates two graphs showing a shorter web page load time of "main.com" due to web acceleration using prefetching based on history. In the uppermost graph, web acceleration does not occur and the client sequentially discovers all web resources on its own. Thus, the client fetches the web resource "First.js" from the main.com web server, the web resource "Second.js" from the Y.com web server, and the web resource "Img.jpg" from the Z.com web server in the current browsing session. Web acceleration occurs in the bottom graph, where the steps "GET First.js," "GET Second.js," and "GET Img.jpg" are eliminated during the current browsing session because the client has prefetched the web resources ahead of time based on history.

A list of frequently visited web pages of a user can be useful for the acceleration of future web pages. For each of the frequently visited web pages, the system can identify and generate a list of domains with web resources to be prefetched, preloaded, and/or preconnected to along with the potential benefits of each web acceleration technique. For each of the domains in the list, the system can identify and generate a list of web resources to be prefetched or preloaded. The system can also identify the potential benefits of prefetching and preloading, as well as the confidence level, priority, and/or dependency information, as describe more fully below.

In at least one implementation, the web acceleration resides inside the web client with an encrypted communication channel between a web client and a web server, since the MITM approach is not desired and the cooperation from the web servers is not guaranteed. In order to accelerate the loading of the web page, web resources can be fetched and fed to the web client ahead of time. Prefetching, preloading, and preconnecting web resources belonging to a web page can be performed by making use of the browsing history.

Figure 8:
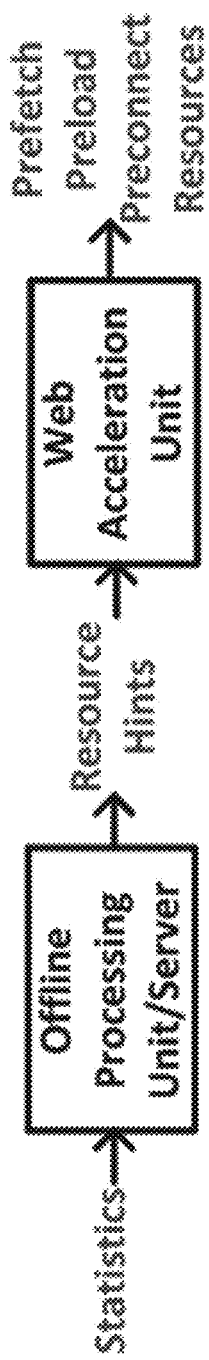
FIG. 8 is a diagram illustrating a method for learning web acceleration based on history.

FIG. 8 is a diagram illustrating a method for learning web acceleration based on history, where web statistics that include the history of web page loads can be collected and input into an offline processing unit/server. Offline processing can be performed to obtain resource hints (also referred to herein as "resource data") from the history. The following resource data records can be generated by offline processing for each learning web client: a list of web sites, a list of access for each of the web sites, an ordered list of web sites based on decreasing order of access frequencies, and/or resource data for each of the web sites. The list of web sites can be denoted as $\{ws_1, ws_2, ws_P\}$ where $ws_i$ is web site "i" denoted by FQDN or FQDN+subfoler. The list of access frequency for each web site in the list can be denoted as $\{af_1, af_2, af_P\}$ where $af_i$ is the access frequency for web site "i" by the learning web client. A web site with higher access frequency means the web site is frequently accessed by the user. Access frequency of a web site can be computed by number of accesses to a web site divided by the total number of accesses to all of the web sites in the list for a learning web client. The list of web sites and their access frequencies can be determined by a user's preference. "THR_af" can denote the threshold for access frequency below which the web sites are not useful to be considered for acceleration since a user rarely access the web sites.

In at least one implementation, the ordered list of web sites is denoted as $\{ows_1, o\ ws_2, ows_P\}$ where the web site $ows_1$ has the biggest access frequency and the web site $ows_P$ has the smallest access frequency for the learning web client. Resource data for each web site, i, in the list may be determined by the characteristics of web sites. A list of web resource included in each web site, i, can be denoted as $\{wr^i_1, wr^i_2, wr^i_{Qi}\}$ where $wr^i_j$ is web resource, j, included in web site, i. This can be denoted by FQDN or FQDN+subfolder. The total confidence level can be denoted by $\{cl^i_1, cl^i_2, \ldots cl^i_Q\}$ where $cl^i_j$ is the confidence level of web resource, j, included in web site, i. "THR_clpf" may be the threshold for total confidence level for prefetching below which there is a low probability that the web resource may not be included in the web site in the future. "THR_clpl" may be the threshold for total confidence level for preloading below which there is a low probability that the web resource may not be included in the web site in the future. "THR_clpc" may be the threshold for total confidence level for preconnecting below which there is a low probability that the web resource may not be included in the web site in the future. The priority level may be denoted by $\{pl^i_1, pl^i_2, \ldots pl^i_Q\}$ where $pl^i_j$ is the confidence level of web resource, j, included in web site, i. The priority level may be used for ordering in accelerating web resources. The ordered list of web resources based on decreasing order of priority level may be denoted as $\{owr^i_1, owr^i_2, \ldots owr^i_{Qi}\}$ where web resource, $owr^i_1$, has the highest priority and web resource, $owr^i_{Qi}$, has the lowest priority level among all the resources in web site, i.

Cacheability may be denoted by a real number between 0 (zero cacheability) and 1 (100% cacheability) and can be determined by HTTP cache control parameters (e.g., "No-Cache," "No-Store") and empirical measurements of cacheability. Furthermore, cacheability may be denoted by $\{ca^i_1, ca^i_2, \ldots ca^i_Q\}$ where $ca^i_j$ is cacheability of web resource, j, included in web site, i. "THR_ca" can be the threshold for cacheability below which it is not useful to cache a web resource. The cache expiration time can be determined by cache-control parameters, max-age and empirical measurement. The cache expiration time may be denoted by $\{et^i_1, et^i_2, \ldots et^i_Q\}$ where $et^i_j$ is expiration time of web resource, j, included in web site, i. Unix Epoch time can be used to represent cache expiration time, which is the number of seconds that have elapsed since 00:00:00 Thursday, 1 Jan. 1970. "Margin_et" can be a margin to account for inaccuracy in estimation of active/idle interval, which may be either positive or negative. The resource data records can include an active/idle interval (e.g., in 24 hours), which can be determined based on a user's access pattern. An idle period can start when a user is not using the web agents, for example when he or she is sleeping or working.

Web acceleration, such as prefetching, preloading, or preconnecting can be performed using the resource data. There can be multiple types of preparing resource readiness for web acceleration at different points in time. Prefetching can be performed when the web agent is idle and network resources are available. One approach is for the web acceleration unit to check periodically if it is an appropriate time for prefetching. For web sites with sufficiently high access frequency, it may be advantageous to prefetch as many cacheable web resources with sufficiently high confidence level as possible if time, network resources, and cache storage allows. The following is one example algorithm which is executed (as far as idle time, network resources, and cache storage allows):

for each web site, $ows_i$, in ordered List of web sites based on decreasing order of access frequencies, $\{ows_1, ows_2, \ldots ows_P\}$, with access frequency above THR_af;

for each web resource, $owr^i_j$, in ordered list of web resources based on decreasing order of priority level, $\{owr^i_1, owr^i_2, \ldots owr^i_{Qj}\}$, if ((cacheability, $ca^i_j$, is greater than THR_ca) and (total confidence level, $cl^i_j$ is greater than THR_clpf));

if expiration time, $et^i_j$, is greater than (margin_et+the start of the next active interval), web resource, $owr^i_j$, is prefetched When a user types a URL for a web site, $ws_i$, the remaining web resources, $ows_i$, of the web site which are not prefetched can be considered to be either preloaded or preconnected based on total confidence level. Preloading and preconnecting can be performed based on the history before the main html of the web site is received. Preconnecting can be performed for web resources with low total confidence levels which are not likely to be included in the web site. The following algorithm can be used by the system:

For each web resource, $owr^i_j$, in ordered list of web resources based on decreasing order of priority level, $\{owr^i_1, owr^i_2, \ldots owr^i_{Qi}\}$, if $owr^i_j$ has not been prefetched and if total confidence level, $cl^i_j$ is greater than THR_clpl, do preload. Else, if total confidence level, $cl^i_j$ is greater than THR_clpc, do preconnect.

Figure 9:
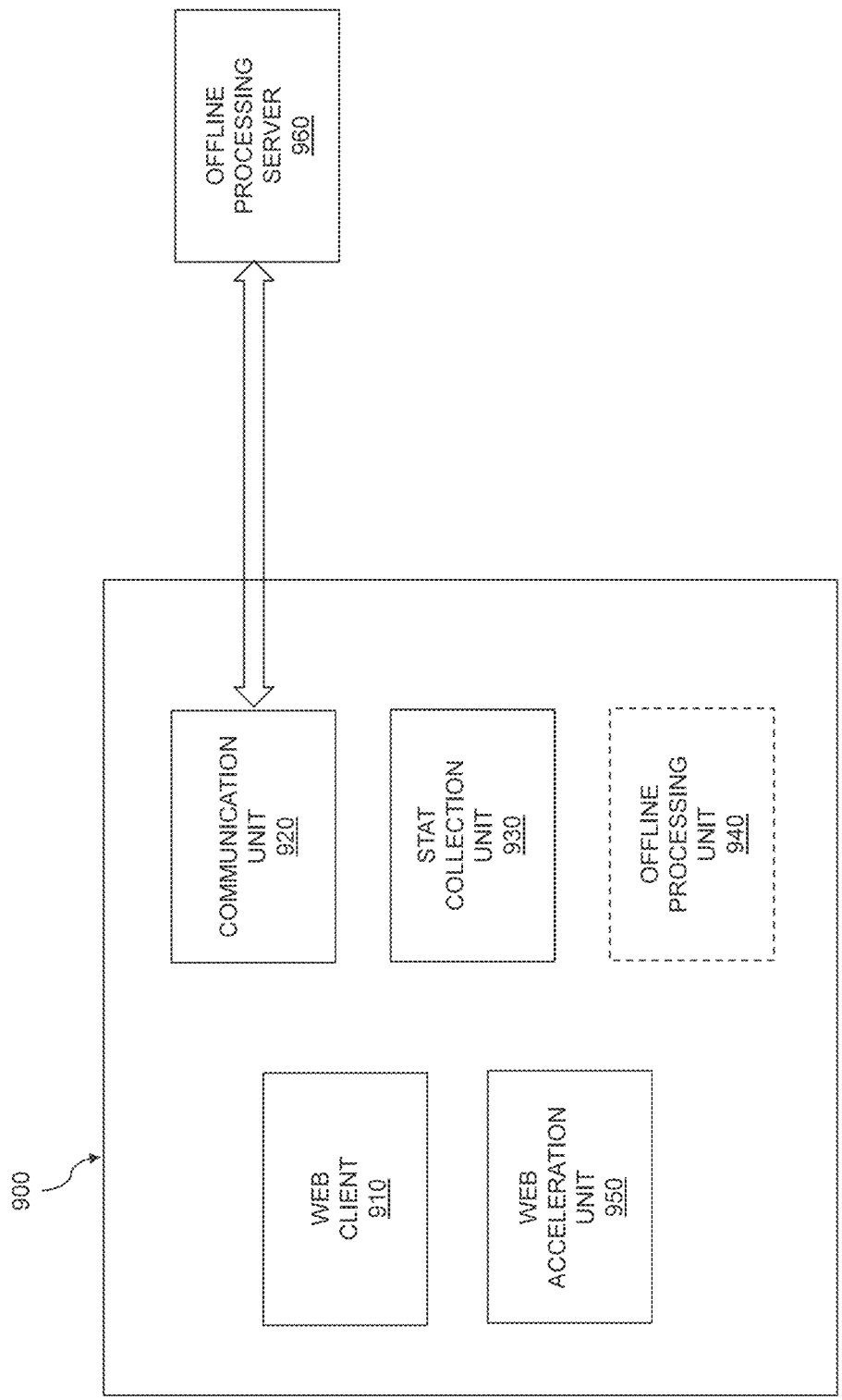
FIG. 9 is a diagram illustrating a learning web client communicating to an offline processing server.

FIG. 9 is a diagram illustrating a learning web client 900 communicating to an offline processing server 960 in one implementation, where the learning web client 900 includes a web client 910, a communication unit 920, a stat collection unit 930, an offline processing unit 940, and a web acceleration unit 950. The web client 910 can interface with the web acceleration unit 950 to accelerate the loading of a web page. With the help of the web client 910, the stat collection unit 930 can collect the history of metadata and performance data, which can be processed by the offline processing unit 940. The web client 910 can provide World Wide Web Consortium (W3C) navigation and timing Application Programming Interface (API) to browser extensions and application. In at least one implementation, the browser has knowledge of everything about the web pages, resources, dependencies, timing, etc. and needs to know which web resource to fetch first in order to "paint" the web pages. The stat collection unit 930 can read the statistics/metadata from the browser via a usual API and an enhanced API. The browsers can help provide this to the stat collection unit 930.

The offline processing unit 940 can receive the statistics from the stat collection unit 930 and generate resource data. The web acceleration unit 950 can receive the resource data from the offline processing unit 940. Based on the resource data, the web acceleration unit 950 can perform web acceleration (e.g., prefetching, preloading, or preconnecting) according to the characteristics of the web resources in the history. The communication unit 920 can obtain the history of metadata and performance data from the stat collection unit 930 and send them to the offline processing server 960.

Figure 10:
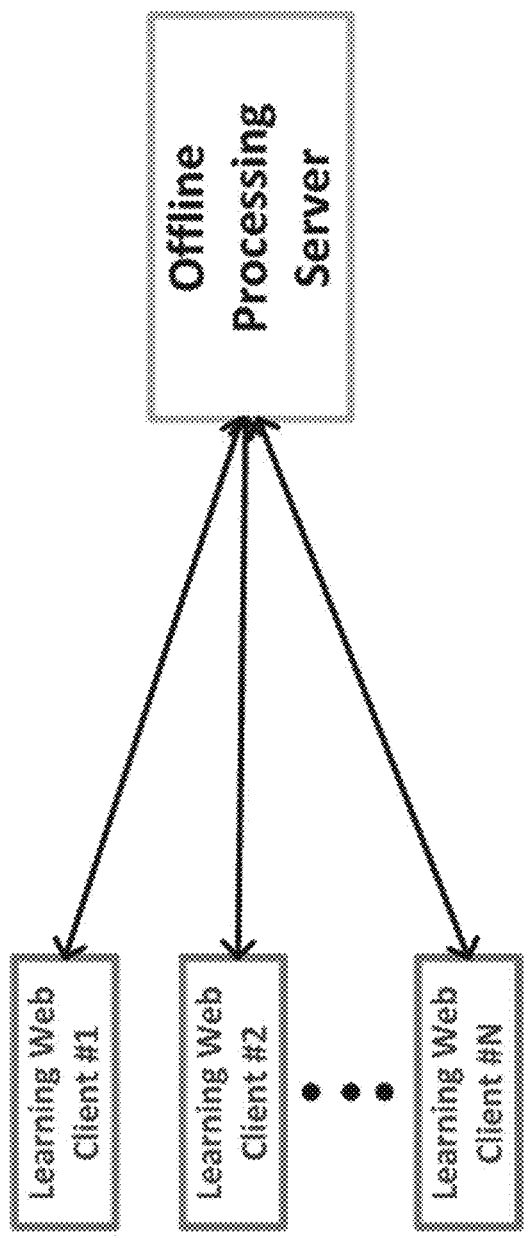
FIG. 10 is a diagram illustrating an offline processing server connected to multiple learning web clients.

FIG. 10 shows that there can be an offline processing server in the cloud which communicates with multiple learning web clients. Offline processing can be done inside the web client or at a server in the cloud or both at the client and at the server. The acceleration system can work in a standalone web client or in a web client connected to a cloud server. In at least one implementation, the statistics collected do not include any web content nor user data; rather, the statistics only include metadata and performance timing information. The collected statistics can include a list of URLs for the web resources which are to be prefetched, preloaded, or preconnected. In order to determine the priority of the web resources, the content type, timing information (e.g., as illustrated in the resource waterfall diagram shown in FIGS. 5A-5C), and dependencies among the resources can also be identified.

The collected statistics can include general information, such as devices, operating system, and web client software, and a list of web sites visited, which can include the Fully Qualified Domain Name (FQDN) (e.g., www.google.com) and/or the FQDN+subfolder (e.g., www.google.com/maps, www.google.com/flights). The collected statistics can also include timing information for resources and web pages.

More specifically, all the timing information provided in Navigation Timing, W3C Specification can be collected: timing information for root resource, which can include URL, startTime, unloadEventStart, unloadEventEnd, domInteractive, domContentLoadedEventStart, domContentLoadedEventEnd, domComplete, loadEventStart, loadEventEnd, NavigationType, redirectCount and resource timing information. All the timing information provided in Resource Timing, W3C Specification can also be collected: timing information for resources in a page, which can include URL, startTime, redirectStart, redirectEnd, fetchStart, domainLookupStart, domainLookupEnd, connectStart, connectEnd, secureConnectionStart, connectEnd, requestStart, responseStart and responseEnd.

In addition, the collected statistics can include metadata of each web resource in a web page, including the content-type (e.g., text/css), the content-length (e.g., 957), and the cache-control parameters in http response headers (e.g., public, max-age=31536000). Statistics can be periodically sent to the offline processing server/unit during idle time, as described below.

The offline processing server/unit can receive statistics, perform offline analysis, and generate resource data. The amount of history in the offline processing server and in the offline processing unit in a web client can be different. Specifically, the history in the offline processing server can include the statistics from all of the web clients in the whole system. The history in the offline processing unit can include the statistics from a web client only and it can be significantly less. Web resources can be customized for different types of devices, such as desktop computers, smart phones, and tablets. Therefore, statistics of all device types can be binned into a few equivalence classes.

The resource data can be used by the web acceleration unit to accelerate the loading of the web page. For a web site (FQDN), resource data can include a list of URLs that include the web resources. For each web resource (URL), the resource data can include a time stamp for generation time, a web client ID, a priority level (a higher priority resource should be considered first) and/or a confidence level. The priority level can be computed based on the statistics from a web client. A "critical path" analysis can be performed on each waterfall diagram of a web client. The waterfall diagram can be constructed based on the timing information statistics. In at least one implementation, a critical path is the long path in the waterfall diagram, where reducing the duration of fetching a web resource on the critical path will reduce the web page load time, while reducing the duration fetching a web resource not on the critical path will not reduce the page load time. All of the web resources on the critical path may be critical (i.e., high priority level). Usually, synchronous JavaScripts and CSS are high priority. A final priority level can be obtained by aggregating the priority levels of a web resource in each waterfall diagram.

The confidence level can include a global confidence level, a personal confidence level, and/or a total confidence level. The global confidence level can include the probability of being in a future web page visit by a user and can be obtained by considering all of the statistics from all of the web clients in the system for a web site. The personal confidence level can be obtained by considering statistics from a web client only. The total confidence level can be a function of the global confidence level and the personal confidence level. For example, the function can be a maximum, a sum, a weighted sum, etc. A web resource with a high confidence level can be prefetched confidently, while for a web resource with low confidence level, preconnecting to the domain which serves this web resource may be sufficient.

Additionally, the resource data can include the cacheabiliy level and/or the cache expiration (max-age) of a web resource. Web resources with longer expiration times can be prefetched when there is idle time. Web resources with low cacheability may need to be preloaded while loading the web page. There can be a complete list of web sites (FQDN or FQDN and subfolder) at the offline processing server, but a web client may need to obtain a short list of frequently visited web sites by a user. For each web site, offline processing can generate the global and/or personal confidence level, the priority level, the cacheabiliy level, and/or the cache expiration for each web resource (URL). The cacheabiliy level and/or the cache expiration can be copied from the cache control header of the newest statistics.

Given resource data of the web sites for a web client, prefetching can be performed ahead of the time to fill up the cache of the web client with web resources having higher total confidence levels and longer cache expiration times. The remaining web resources of a web site can be preloaded or preconnected based on their total confidence levels and other resource data when the web site is visited by the user.

A list of frequently accessed web sites can be obtained based on the access frequency of a user. An ordered list of web sites can be generated with a decreasing order of access frequency. Starting from the top of the ordered list of the web sites, prefetching of web resources of the web site with higher total confidence levels and longer cache expiration times can be performed according to the priority level during idle time well before the web site is visited by the user.

When a web site is visited by the user, preloading and preconnecting of remaining web resources of the web site can be performed based on the priority of the resources. Preloading can be performed for the web resources with higher total confidence levels. Preconnecting to the domain can be performed for web resources with lower total confidence levels since the system is not sure which web resources need to be fetched.

Machine learning can also be applied to obtain the list of web resources from the global and local statistics. The objective may be to obtain four sets of web resources to be prefetched, preloaded, preconnected, and to be left alone (i.e., no web acceleration). Machine learning can be modelled as a classification problem. For a given web site, the inputs to a machine learning algorithm can include global and local statistics, a waterfall diagram, and other metadata where the global and local statistics correspond to statistics from all of the web clients of the system and statistics from a web client, respectively. Machine learning can also be used for the determination of confidence levels and priority levels.

Resource data can be updated periodically or after every "x" number of new visits when there is new global and local statistics available. The confidence levels of web resources may naturally decrease with time. Resource data can also be reduced by penalizing for incorrect wasted prefetches, preloads, and preconnects.

One goal of the system is to avoid unscrupulously prefetching. Prefetching traffic may compete with other time sensitive traffic and it may degrade Quality of Experience of the same user or different users sharing the same internet access link. Prefetching may also add to the data cap of the user if the internet access link is metered. Therefore, prefetching can be performed based on access network cost. The access network cost can be considered based on the time of day, such as off-peak hours versus peak hours. Some internet service providers offer non-metered data during off-peak hours. The access network cost can also be considered based on the access link traffic congestion level provided by traffic monitoring software. When and what to prefetch can be determined according to resource data parameters together with the access network cost.

There may be limited network resources for uploading statistics from a web client to an offline process server. There also may be limited network resources for downloading resource data from the offline processing server to a web client. In these instances, resource data can be generated using the local statistics from the web client if there is a sufficient amount of statistics.

Communication between a web client and an offline processing server may not be available all of the time. In this scenario, the resource data can be updated using local statistics. When communication becomes available again, the resource data can be updated with global statistics. In order to avoid traffic congestion, it may be beneficial to limit the exchanges to short windows, such as once a day during non-peak hours. All of the statistics can be compressed before the exchange to save data usage.

Figure 11:
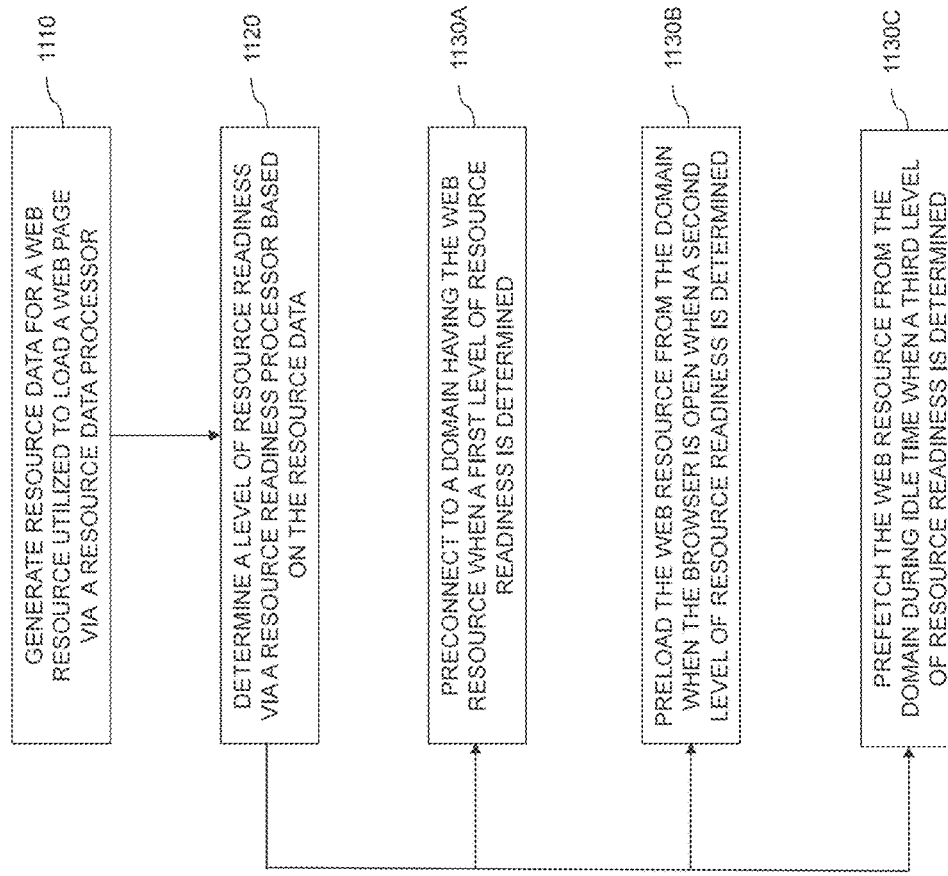
FIG. 11 is a flow diagram illustrating a method of reducing load time of a web page in a browser.

FIG. 11 is a flow diagram illustrating a method of reducing load time of a web page in a browser. Resource data for a web resource utilized to load the web page can be generated via a resource data processor (1110). As described more fully above, the resource data can include the age of the web resource, the cacheability level of the web resource, the cache expiration of the web resource, the priority level of the web resource, and/or the confidence level of the web resource. Accuracy may drop as statistics get older. The confidence level can indicate the probability that the web resource will be retrieved in a future visit by a user based on a history of retrievals of the web resource. More specifically, the confidence level of the web resource can include a global confidence level, a personal confidence level, and/or a total confidence level, which can be generated based on the global confidence level and the personal confidence level. The global confidence level can indicate the probability that the web resource will be retrieved in a future visit by the user based on the history of retrievals by all users of the web resource. The personal confidence level can indicate the probability that the web resource will be retrieved in a future visit by the user based only on the browsing history of the user.

A level of resource readiness can be determined via a resource readiness processor based on the resource data (1120). Resource readiness for the web page can be prepared by a web acceleration processor based on the level of resource readiness, which can include preconnecting, preloading, or prefetching. Preconnecting to a domain having the web resource can be performed when a first level of resource readiness is determined (1130A). The resource data may indicate a first level of resource readiness when the web resource includes an age below a first threshold, a confidence level above a second threshold and below a third threshold, a cacheability level above a fourth threshold and below a fifth threshold, a cache expiration above a sixth threshold and below a seventh threshold, and/or a priority level above an eighth threshold and below a ninth threshold. Preconnecting can include opening a connection to the domain; however, no web resources are retrieved from the domain. This can include performing a domain name system (DNS) lookup, transmission control protocol (TCP) handshakes, and/or transport layer security (TLS) handshakes.

Preloading the web resource from the domain when the browser is open can be performed when a second level of resource readiness is determined (1130B). The second level of resource readiness can be greater than the first level of resource readiness. The resource data may indicate a second level of resource readiness when the web resource includes an age below a tenth threshold, the tenth threshold being less than the first threshold, a confidence level above the third threshold and below an eleventh threshold, a cacheability level above the fifth threshold and below a twelfth threshold, a cache expiration above the seventh threshold and below a thirteenth threshold, and/or a priority level above the ninth threshold and below a fourteenth threshold.

Prefetching the web resource from the domain can be performed during idle time when a third level of resource readiness is determined (1130C). Prefetching can be performed prior to opening of the browser, as opposed to preloading, which may only be performed when the browser is open. The third level of resource readiness can be greater than the second level of resource readiness. The resource data may indicate a third level of resource readiness when the web resource includes an age below a fifteenth threshold, the fifteenth threshold being less than the tenth threshold, a confidence level above the eleventh threshold, a cacheability level above the twelfth threshold, a cache expiration above the thirteenth threshold, and a priority level above the fourteenth threshold.

In one example, the web resource XYZ has an age of 4 days, a confidence level of 73%, a cacheability level of 5, a cache expiration of 7 days, and a priority level of 3. In this example, the age resource datum falls within the first level of resource readiness (the first threshold=5 days); the confidence level datum falls within the second level of resource readiness (the third threshold=60% and the third threshold=80%); the cacheability level datum falls within the third level of resource readiness (the thirteenth threshold=4); the cache expiration datum falls within the second level of resource readiness (fifth threshold=5 days and the twelfth threshold=10 days); and the priority level datum falls within the second level of resource readiness (ninth threshold=2 and the fourteenth threshold=4). When resource data falls within multiple levels of resource readiness, the resource data processor can select the level of resource readiness having the greatest number of resource data. In the above example, because the second level of resource readiness has the greatest number of resource data (i.e., 3), the processor performs preloading.

In at least one implementation, the resource readiness processor generates a weighted score for each resource datum by multiplying the value for each resource datum by a coefficient. For example, the values for age, confidence level, cacheability level, cache expiration, and priority level can be multiplied by the coefficients 1.0, 3.0, 2.0, 1.5, 2.5, respectively. In at least one implementation, the resource readiness processor generates a score for each resource datum, e.g., point score from 0-5, 0-100, etc. The web acceleration processor can perform preconnecting when the weighted score is below a sixteenth threshold, preloading when the weighted score is above the sixteenth threshold and below a seventeenth threshold, and prefetching when the weighted score is above the seventeenth threshold.

In the example above, the resource readiness processor generates the following scores for web resource XYZ: age=1; confidence level=3; cacheability level=5; cache expiration=3; and priority level=of 3. Given the coefficients 1.0, 3.0, 2.0, 1.5, 2.5, as described above, the total weighted score for web resource XYZ=(1.0×1)+(3.0×3)+(2.0×5)+(1.5×3)+(2.5×3)=32. In this example, the sixteenth threshold=20 and the seventeenth threshold=40. Thus, the second level of resource readiness is determined for the web resource XYZ and preloading is performed.

Figure 12:
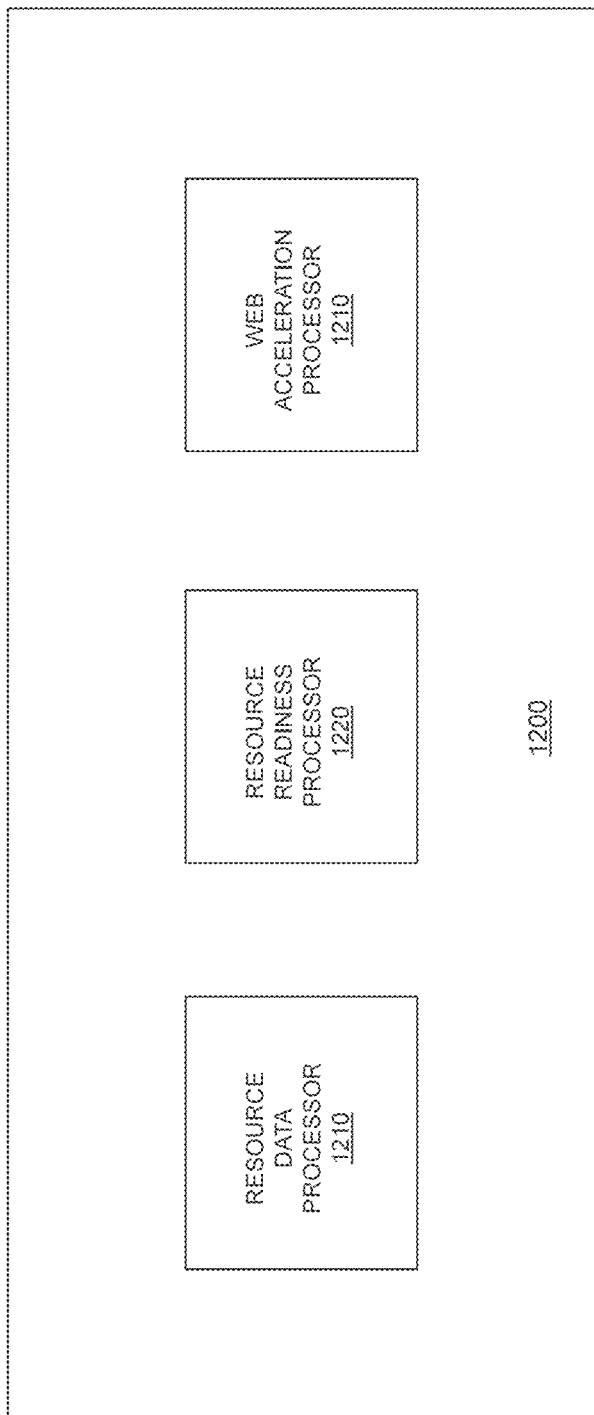
FIG. 12 is a diagram illustrating a system of reducing load time of a web page in a browser.

FIG. 12 is a diagram illustrating a system 1200 for reducing load time of a web page in a browser, wherein the system 1200 includes a resource data processor 1210, a resource readiness processor 1220, and a web acceleration processor 1230. Although FIG. 12 illustrates three separate hardware components, it is recognized that the resource data processor 1210, the resource readiness processor 1220, and the web acceleration processor 1230 could reside on a single hardware component (e.g., processor). As used herein, the term "resource data processor" includes a computer hardware device that generates resource data for a web resource utilized to load the web page.

The resource data can include the age of the web resource, the cacheability level of the web resource, the cache expiration of the web resource, the priority level of the web resource, and/or the confidence level of the web resource indicating a probability that the web resource will be retrieved in a future visit by a user based on a history of retrievals of the web resource. The confidence level of the web resource can include a global confidence level of the web resource indicating a probability that the web resource will be retrieved in a future visit by the user based on a history of retrievals by all users of the web resource, a personal confidence level of the web resource indicating a probability that the web resource will be retrieved in a future visit by the user based only on a browsing history of the user, and/or a total confidence level of the web resource that is generated based on the global confidence level and the personal confidence level.

As used herein, the term "resource readiness processor" includes a computer hardware device connected to the resource data processor. As used herein, the term "connected" can include operationally connected, logically connected, in communication with, physically or wirelessly connected, engaged, coupled, contacts, linked, affixed, and attached. The resource readiness processor 1220 can determine the level of resource readiness of the web resource based on the resource data.

More specifically, the resource readiness processor 1220 can determine a first level of resource readiness when the resource data includes an age below a first threshold, a confidence level above a second threshold and below a third threshold, a cacheability level above a fourth threshold and below a fifth threshold, a cache expiration above a sixth threshold and below a seventh threshold, and/or a priority level above an eighth threshold and below a ninth threshold. The resource readiness processor 1220 can determine a second level of resource readiness when the resource data includes an age below a tenth threshold, the tenth threshold being less than the first threshold, a confidence level above the third threshold and below an eleventh threshold, a cacheability level above the fifth threshold and below a twelfth threshold, a cache expiration above the seventh threshold and below a thirteenth threshold, and/or a priority level above the ninth threshold and below a fourteenth threshold. The resource readiness processor 1220 can determine a third level of resource readiness when the resource data includes an age below a fifteenth threshold, the fifteenth threshold being less than the tenth threshold, a confidence level above the eleventh threshold, a cacheability level above the twelfth threshold, a cache expiration above the thirteenth threshold, and/or a priority level above the fourteenth threshold. When a web resource has an age at or above the first threshold, a confidence level below the second threshold, a cacheability level below the fourth threshold, a cache expiration below the sixth threshold, and/or a priority level below the eighth threshold the resource readiness processor 1220 in at least one implementation determines that the level of resource readiness is zero (0) and web acceleration is not performed. The resource readiness processor 1220 can select a level of resource readiness having the greatest number of resource data when resource data falls within multiple levels of resource readiness.

As used herein, the term "web acceleration processor" includes a computer hardware device connected to the resource readiness processor. The web acceleration processor 1230 can prepare resource readiness for the web page based on the level of resource readiness. More specifically, the web acceleration processor 1230 can preconnect to a domain having the web resource when a first level of resource readiness is determined, preload the web resource from the domain when the browser is open when a second level of resource readiness is determined, or prefetch the web resource from the domain prior to opening of the browser when a third level of resource readiness is determined. In at least one implementation, prefetching can be performed when a browser is open. Preloading and preconnecting of the web resources can be performed when a particular web site is visited. Prefetching of many web sites can be performed when those web sites are not being visited. The second level of resource readiness can be greater than the first level of resource readiness; and, the third level of resource readiness can be greater than the second level of resource readiness. As describe above, the resource readiness processor 1220 can generate a weighted score for each resource datum in the resource data, wherein the web acceleration processor 1230 can preconnects to the domain when the weighted score is below a sixteenth threshold, preload the web resource when the weighted score is above the sixteenth threshold and below a seventeenth threshold, or prefetch the web resource when the weighted score is above the seventeenth threshold.

Aspects of the present device and methods may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 13:
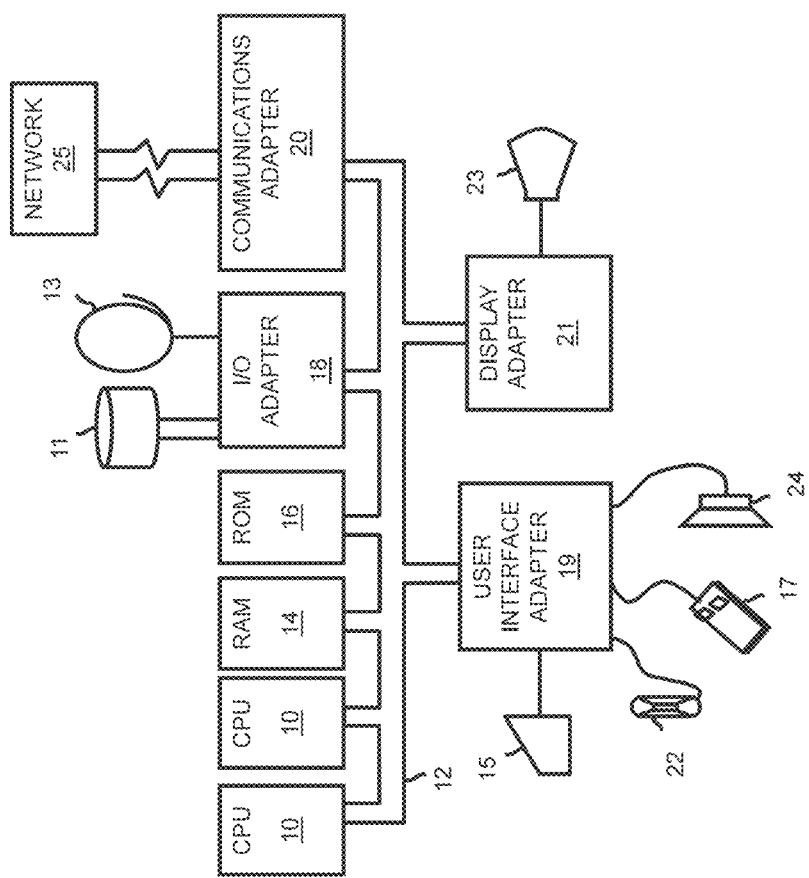
FIG. 13 is a diagram illustrating a computer program product for reducing load time of a web page in a browser.

Referring now to FIG. 13, a representative hardware environment for reducing load time of a web page in a browser is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method of reducing load time of a web page in a browser, the method comprising:
   generating, via a resource data processor, resource data for a web resource utilized to load the web page, the resource data including at least one of:
      an age of the web resource,
      a confidence level of the web resource, the confidence level indicating a probability that the web resource will be retrieved in a future visit by a user based on a history of retrievals of the web resource,
      a cacheability level of the web resource,
      a cache expiration of the web resource, and
      a priority level of the web resource;
   determining, via a resource readiness processor, at least one level of resource readiness of the web resource based on the resource data; and
   preparing, via a web acceleration processor, resource readiness for the web page based on the at least one level of resource readiness, the preparing resource readiness including one of:
      preconnecting to a domain having the web resource when a first level of resource readiness is determined,
      preloading the web resource from the domain when a second level of resource readiness is determined, the second level of resource readiness being greater than the first level of resource readiness, wherein the preloading is performed when the browser is open, and
      prefetching the web resource from the domain when a third level of resource readiness is determined, the third level of resource readiness being greater than the second level of resource readiness, wherein the prefetching is performed prior to opening of the browser;
   wherein the determining via the resource readiness processor the at least one level of resource readiness includes determining the first level of resource readiness when the resource data includes at least one of:
      the age below a first threshold;
      the confidence level above a second threshold and below a third threshold;
      the cacheability level above a fourth threshold and below a fifth threshold;
      the cache expiration above a sixth threshold and below a seventh threshold; and
      the priority level above an eighth threshold and below a ninth threshold.

2. The method according to claim 1, wherein the prefetching of the web resource is performed during an idle time of the browser.

3. The method according to claim 1, wherein the determining via the resource readiness processor the at least one level of resource readiness includes determining the second level of resource readiness when the resource data includes at least one of:
   the age below a tenth threshold, the tenth threshold being less than the first threshold;
   the confidence level at or above the third threshold and at or below an eleventh threshold;
   the cacheability level at or above the fifth threshold and at or below a twelfth threshold;
   the cache expiration at or above the seventh threshold and at or below a thirteenth threshold; and
   the priority level at or above the ninth threshold and at or below a fourteenth threshold.

4. The method according to claim 3, wherein the determining via the resource readiness processor the at least one level of resource readiness includes determining the third level of resource readiness when the resource data includes at least one of:
   the age below a fifteenth threshold, the fifteenth threshold being less than the tenth threshold;
   the confidence level above the eleventh threshold;
   the cacheability level above the twelfth threshold;
   the a cache expiration above the thirteenth threshold; and
   the priority level above the fourteenth threshold.

5. The method according to claim 1, wherein the confidence level of the web resource includes at least one of:
   a global confidence level of the web resource, the global confidence level indicating a probability that the web resource will be retrieved in the future visit by the user based on the history of retrievals by all users of the web resource;
   a personal confidence level of the web resource, the personal confidence level indicating a probability that the web resource will be retrieved in the future visit by the user based only on a browsing history of the user; and
   a total confidence level of the web resource, the total confidence level being generated based on the global confidence level and the personal confidence level.

6. The method according to claim 1, wherein the determining via the resource data processor the at least one level of resource readiness includes selecting a level of resource readiness having a greatest number of the resource data when the resource data falls within multiple levels of resource readiness.

7. The method according to claim 1, wherein the determining via the resource data processor the at least one level of resource readiness includes generating a weighted score for each resource datum in the resource data, and
   the preparing via the resource readiness processor the resource readiness for the web page includes:
      preconnecting to the domain when the weighted score is below a sixteenth threshold, preloading the web resource when the weighted score is above the sixteenth threshold and below a seventeenth threshold, and prefetching the web resource when the weighted score is above the seventeenth threshold.

8. A system of reducing load time of a web page in a browser, the system comprising:

a resource data processor, the resource data processor being configured to generate resource data for a web resource utilized to load the web page, the resource data including at least two of:

an age of the web resource, a confidence level of the web resource, the confidence level indicating a probability that the web resource will be retrieved in a future visit by a user based on a history of retrievals of the web resource, a cacheability level of the web resource, a cache expiration of the web resource, and a priority level of the web resource;

a resource readiness processor connected to the resource data processor, the resource readiness processor being configured to determine at least one level of resource readiness of the web resource based on the resource data; and a web acceleration processor connected to the resource readiness processor, the web acceleration processor being configured to prepare resource readiness for the web page based on the at least one level of resource readiness, the preparing resource readiness including one of:

preconnecting to a domain having the web resource when a first level of resource readiness is determined, preloading the web resource from the domain when a second level of resource readiness is determined, the second level of resource readiness being greater than the first level of resource readiness, wherein the preloading is performed when the browser is open, and prefetching the web resource from the domain when a third level of resource readiness is determined, the third level of resource readiness being greater than the second level of resource readiness, wherein the prefetching is performed prior to opening of the browser;

wherein the resource readiness processor is configured to determine the first level of resource readiness when the resource data includes at least two of:

the age below a first threshold;

the confidence level above a second threshold and below a third threshold;

the cacheability level above a fourth threshold and below a fifth threshold;

the cache expiration above a sixth threshold and below a seventh threshold; and the priority level above an eighth threshold and below a ninth threshold.

9. The system according to claim 8, wherein the resource readiness processor is configured to determine the first level of resource readiness when the resource data includes at least two of:

the age below a first threshold;

the confidence level above a second threshold and below a third threshold;

the cacheability level above a fourth threshold and below a fifth threshold;

the cache expiration above a sixth threshold and below a seventh threshold; and the priority level above an eighth threshold and below a ninth threshold.

10. The system according to claim 9, wherein the resource readiness processor is configured to determine the second level of resource readiness when the resource data includes at least two of:

the age below a tenth threshold, the tenth threshold being less than the first threshold;

the confidence level at or above the third threshold and at or below an eleventh threshold;

the cacheability level at or above the fifth threshold and at or below a twelfth threshold;

the cache expiration at or above the seventh threshold and at or below a thirteenth threshold; and the priority level at or above the ninth threshold and at or below a fourteenth threshold.

11. The system according to claim 10, wherein the resource readiness processor is configured to determine the third level of resource readiness when the resource data includes at least two of:

the age below a fifteenth threshold, the fifteenth threshold being less than the tenth threshold;

the confidence level above the eleventh threshold;

the cacheability level above the twelfth threshold;

the cache expiration above the thirteenth threshold; and the priority level above the fourteenth threshold.

12. A computer program product for reducing load time of an encrypted web page in a browser, the computer program product comprising:

a computer readable storage medium having encoded thereon:

first program instructions executable by a processor to cause the processor to generate resource data for a web resource utilized to load the encrypted web page, the resource data including a confidence level of the web resource, the confidence level indicating a probability that the web resource will be retrieved in a future visit by a user based on a history of retrievals of the web resource;

second program instructions executable by the processor to cause the processor to determine at least one level of resource readiness of the web resource based on the resource data; and third program instructions executable by the processor to cause the processor to prepare resource readiness for the web page based on the at least one level of resource readiness, the preparing resource readiness including one of:

preconnecting to a domain having the web resource when a first level of resource readiness is determined, preloading the web resource from the domain when a second level of resource readiness is determined, the second level of resource readiness being greater than the first level of resource readiness, wherein the preloading is performed when the browser is open, and prefetching the web resource from the domain when a third level of resource readiness is determined, the third level of resource readiness being greater than the second level of resource readiness, wherein the prefetching is performed prior to opening of the browser;

wherein the second program instructions executable by the processor to further cause the processor to determine the first level of resource readiness when the resource data includes:
an age below a first threshold;
the confidence level above a second threshold and below a third threshold;
a cacheability level above a fourth threshold and below a fifth threshold;
a cache expiration above a sixth threshold and below a seventh threshold; and
a priority level above an eighth threshold and below a ninth threshold.

13. The computer program product according to claim 12, wherein the resource data includes at least one of an age of the web resource and an age of the resource data.

14. The computer program product according to claim 12, wherein the resource data includes a cacheability level of the web resource.

15. The computer program product according to claim 12, wherein the resource data includes a cache expiration of the web resource.

16. The computer program product according to claim 12, wherein the resource data includes a priority level of the web resource.

17. The computer program product according to claim 12, wherein the second program instructions executable by the processor to further cause the processor to determine the second level of resource readiness when the resource data includes:
the age below a tenth threshold, the tenth threshold being less than the first threshold;
the confidence level above the third threshold and below an eleventh threshold;
the cacheability level above the fifth threshold and below a twelfth threshold;
the cache expiration above the seventh threshold and below a thirteenth threshold; and
the priority level above the ninth threshold and below a fourteenth threshold.

18. The computer program product according to claim 17, wherein the second program instructions executable by the processor to further cause the processor to determine the third level of resource readiness when the resource data includes:
the age below a fifteenth threshold, the fifteenth threshold being less than the tenth threshold;
the confidence level above the eleventh threshold;
the cacheability level above the twelfth threshold;
the cache expiration above the thirteenth threshold; and
the priority level above the fourteenth threshold, wherein the eighth threshold, the ninth threshold, and the fourteenth threshold depend on availability of idle time, network resources, and storage resources.

* * * * *